United States Patent [19]

Kojima et al.

[11] Patent Number: 4,491,880

[45] Date of Patent: Jan. 1, 1985

[54] MAGNETIC RECORDING AND/OR REPRODUCING APPARATUS

[75] Inventors: Noboru Kojima, Yokohama; Yoshizumi Watatani, Fujisawa; Takao Arai, Yokohama; Takashi Hoshino, Fujisawa; Toshifumi Shibuya, Yokohama, all of Japan

[73] Assignee: Hitachi, Ltd., Tokyo, Japan

[21] Appl. No.: 421,401

[22] Filed: Sep. 22, 1982

[30] Foreign Application Priority Data

Sep. 24, 1981 [JP] Japan ................. 56-149397

[51] Int. Cl.³ .............................................. H04N 5/782
[52] U.S. Cl. ...................................... 360/19.1; 358/343
[58] Field of Search ................ 358/341, 343; 360/18, 360/19.1, 63

[56] References Cited

U.S. PATENT DOCUMENTS

3,283,085 11/1966 Lemke .................................. 360/19.1
4,363,039 12/1982 Nishimura et al. ................ 360/19.1

Primary Examiner—Robert L. Richardson
Attorney, Agent, or Firm—Antonelli, Terry & Wands

[57] ABSTRACT

In a magnetic recording and reproducing apparatus of 2-head helical scan type, an overlapping portion is formed at one end of each video track on a magnetic tape, and a PCM audio signal is recorded on this overlapping portion. Video/audio selective switching circuits are disposed on the input or output side of video and audio recording amplifiers, and video/audio selective switching circuits and video/audio playback equalizer circuits are disposed on the output side of video and audio playback amplifiers. Each of the heads acts as both of a video head and an audio head.

7 Claims, 12 Drawing Figures

MAGNETIC RECORDING AND/OR REPRODUCING APPARATUS

This invention relates to a magnetic recording and/or reproeducing apparatus such as a video tape recorder of two-head helical scan type, and more particularly to an apparatus of the kind above described which records a video signal in a helical direction of a magnetic tape together with an audio signal and/or reproduces the recorded video and audio signals.

In a conventional video tape recorder, a video signal is recorded in a helical direction of a magnetic tape, and an audio signal is recorded in a feeding direction (longitudinal direction) of the magnetic tape. However, according to such a manner of audio recording, it has been difficult to ensure reproduction of sound of high quality.

In an effort to ensure reproduction of sound of high quality, a method has been proposed in which an audio track extends in a helical direction of a magnetic tape like a video track extending in the helical direction, and a PCM audio signal is recorded on such an audio track.

Figure 1:
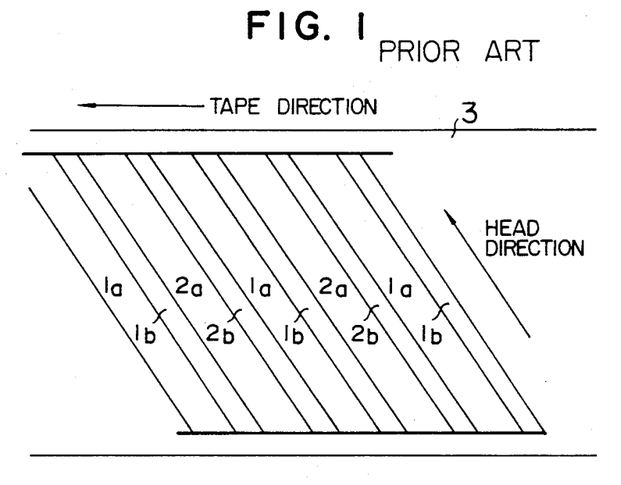
FIG. 1 shows schematically a prior art pattern of tracks of records.

FIG. 1 shows an example of a pattern of such tracks of records formed on a magnetic tape 3. In FIG. 1, fields of two channels of a video signal are recorded to form video tracks 1a and 2a respectively on the magnetic tape 3, and an audio signal corresponding to the video signal is recorded to form corresponding audio tracks 1b and 2b. It will be seen in FIG. 1 that these tracks 1a to 2b extend in the helical direction of the magnetic tape 3 and are separately formed to be juxtaposed in the order of 1a, 1b, 2a, 2b in the feeding direction (longitudinal direction) of the magnetic tape 3.

However, such a recording method is inevitably attended with a great deterioration of the recording density on the tape. Further, such a recording method is not fully satisfactory in that it is difficult to suppress undesirable crosstalk between the video signal and the audio signal reproduced from the adjacent tracks in the playback mode.

Another recording method has also been proposed, in which an audio track is provided as an extension, that is, an overlapping portion, of a video track formed in a helical direction of a magnetic tape, and an audio signal compressed in its time base is recorded to form such an audio track.

This latter recording method provides such merits that the recording density on the tape can be considerably improved over the former method, and undesirable crosstalk between the adjacent tracks can be easily suppressed by utilization of an azimuth effect and a comb shaped filter.

However, a total of four magnetic heads have been required according to the prior art recording method, since independent magnetic heads are required for the recording and reproduction of the video signal on and from the video tracks of two channels respectively, and independent magnetic heads are also required for the recording and reproduction of the audio signal from the audio tracks of two channels respectively. Further, because of the different reproducing characteristics of the four magnetic heads, it has been necessary to provide a preamplifier in each of the four reproducing systems. Furthermore, because of the fact that, when the audio signal is recorded in the PCM form, demodulators having different frequency characteristics are required for the demodulation of the reproduced FM luminance signal of the video signal and the reproduced PCM audio signal, it has been necessary to provide an AGC/playback equalizer circuit in each of the four reproducing systems. The above requirements have resulted in a great increase in the cost of the video tape recorder.

It is therefore a primary object of the present invention to provide a magnetic recording and/or reproducing apparatus including two magnetic heads each of which serves to record and/or reproduce both of a video signal and an audio signal so that these signals can be recorded and/or reproduced by these two heads.

The magnetic recording apparatus according to the present invention which attains the above object comprises, in the preceding stage of a first and a second magnetic head forming tracks of first and second channels respectively in a helical direction of a magnetic tape, a first recording amplifier and a second recording amplifier amplifying a video signal and an audio signal, and switching means for applying the video signal to the first or second head during the period of time in which the first or second head is in recording contact with the magnetic tape for forming the video track of first or second channel, and applying the audio signal to the first or second head during the period of time in which the first or second head forms subsequently the audio track of first or second channel, whereby the first and second heads record continuously both of the video signal and the audio signal to form the tracks of first and second channels respectively. Thus, when the audio signal of first channel is recorded by the first head, the video signal of second channel is recorded by the second head, while, when the audio signal of second channel is recorded by the second head, the video signal of first channel is recorded by the first head.

The reproducing apparatus according to the present invention comprises, in the succeeding stage of the first and second heads, a first playback amplifier and a second playback amplifier amplifying the video signal and audio signal reproduced by the magnetic heads, and switching means for selectively switching between the video signal and the audio signal amplified by the amplifiers.

Thus, according to the present invention, a video signal and an audio signal can be recorded and/or reproduced by two magnetic heads thereby obviating the prior art defects pointed out hereinbefore.

The above and other objects, features and advantages of the present invention will be apparent from the following detailed description of preferred embodiments thereof taken in conjunction with the accompanying drawings, in which:

The manner of recording according to the present invention will now be described with reference to a tape-head system in a magnetic recording and/or reproducing apparatus of two-head helical scan type shown in FIG. 2 and also to a pattern of tracks of records shown in FIG. 3.

Figure 2:
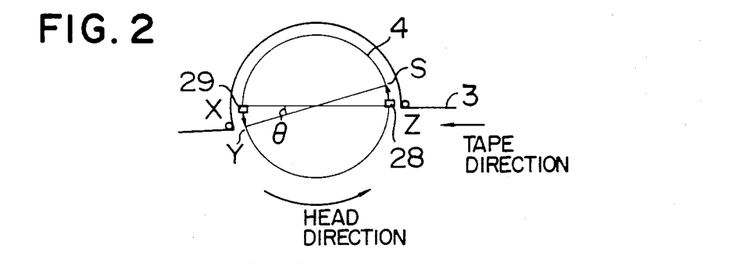
FIG. 2 is a schematic plan view of a tape running system in a magnetic recording and/or reproducing apparatus of two-head helical scan type.

Referring to FIG. 2, a rotary cylinder 4 rotates at the frame frequency, and a pair of magnetic heads 28 and 29 carried by the rotary cylinder 4 rotate together with the rotary cylinder 4. These magnetic heads 28 and 29 are disposed to define an angular spacing of 180° therebetween. A magnetic tape (a video tape) 3 engages part of the peripheral surface of the rotary cylinder 4 in a relation helical with respect to the peripheral surface of the rotary cylinder 4 and covering an angle of (180°+θ). The angle θ corresponds to about 20H (H: the horizontal synchronizing period of a video signal) and is preferably about 14°. In the range (Z–X) corresponding to the tape engagement angle of 180°, a video signal is recorded on the magnetic tape 3 by the magnetic heads 28 and 29, while, in the range (X–Y) corresponding to the overlapping angle of θ, a time-base compressed audio signal is recorded in PCM form on the magnetic tape 3 by the magnetic heads 28 and 29.

Figure 3:
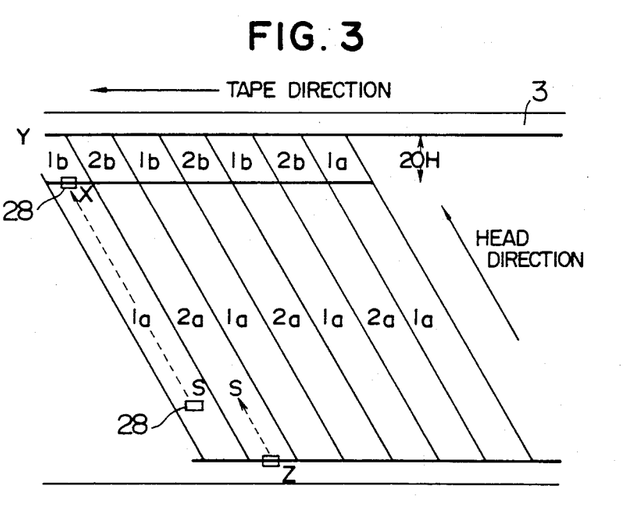
FIG. 3 shows schematically a pattern of tracks of records formed according to the present invention.

A pattern of tracks of records formed on the magnetic tape 3 is shown in FIG. 3. In FIG. 3, 1a and 2a designate video tracks formed by recording with the magnetic heads 28 and 29 respectively, and 1b and 2b designate audio tracks formed by recording with the magnetic heads 28 and 29 respectively. These tracks are repeatedly formed as shown by selecting the tape engagement angle relative to the rotary cylinder 4 to be (180°+θ) and helically scanning the magnetic tape 3 by the magnetic heads 28 and 29 upward from the lower side of the tape 3. In order that the audio tracks 1b and 2b can be formed in a relation contiguous to the respective video tracks 1a and 2a, the input to the magnetic heads 28 and 29 is to be switched over from a video signal to an audio signal when each of the magnetic heads 28 and 29 is brought to the position opposite to the point X in FIG. 2 as described later. According to such a manner of recording, an audio signal is recorded on, for example, the audio track 1b (2b) by, for example, the magnetic head 28 (29) in simultaneous relation with recording of a video signal by the other magnetic head 29 (28) on the lower end portion of the video track 2a (1a) in the range (Z–S) shown in FIG. 2. The symbols S, X, Y and Z shown in FIG. 3 correspond to those indicating the positional relation-ship between the magnetic heads 28, 29 and the magnetic tape 3 in FIG. 2.

Figure 4:
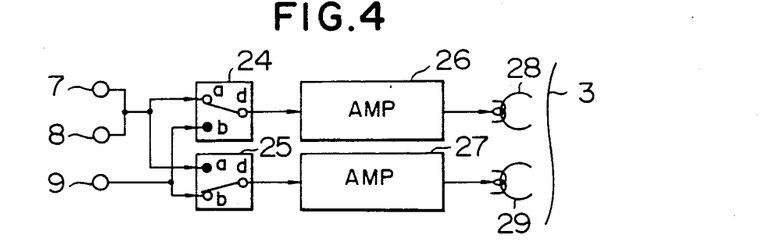
FIG. 4 is a block diagram showing the structure of an embodiment of the recording apparatus according to the present invention.

An apparatus for recording a video signal and an audio signal according to such a manner of recording will now be described. FIG. 4 is a block diagram showing the structure of an embodiment of the recording circuit according to the present invention. Referring to FIG. 4, a video signal is applied to input terminals 7 and 8. More precisely, its FM luminance signal is applied to the input terminal 7, and its low-band converted chrominance signal is applied to the input terminal 8. A PCM audio signal is applied to another input terminal 9. Signal selective switching circuits 24 and 25 select the video signal and the audio signal applied to the input terminals 7, 8 and 9. Each of these switching circuits 24 and 25 is connected at its one input terminal a to the video signal input terminals 7 and 8, and at the other input terminal b to the audio signal input terminal 9. The switching circuits 24 and 25 may be, for example, relay switching circuits or electronic switching circuits. Recording amplifiers 26 and 27 are connected at their input terminals to output terminals d of the switching circuits 24 and 25 respectively so that the video signal or the audio signal appearing at the output terminals d can be applied to the magnetic heads 28 and 29 of first channel and second channel respectively.

The operation of the recording circuit shown in FIG. 4 will be described with reference to FIGS. 2 and 3.

Suppose now that, when both of the first and second heads 28 and 29 are located outside of the overlapping range (X–Y), and the first head 28, for example, is located in the range (S–X) in FIG. 2, a video signal representing one field of first channel is applied to the video signal input terminals 7 and 8 to be applied to the first head 28. In such a case, the FM luminance signal applied to the input terminal 7 and the low frequency band converted chrominance signal applied to the input terminal 8 are applied through the input terminal a of the first switching circuit 24 to the first recording amplifier 26, and the output signal from this amplifier 26 is applied to the first head 28 to be recorded on a magnetic tape 3 as a video track 1a (S–X) as shown in FIG. 3. At this time, no PCM audio signal is applied to the audio signal input terminal 9, and the second switching circuit 25 is free or open and ready for connecting one or more of the input terminals to the second recording amplifier 27.

The first head 28 having recorded the field of first channel moves then into the overlapping range (X–Y) in FIG. 2. In this case, the first switching circuit 24 is switched over to be connected at its input terminal b to the audio signal input terminal 9. An audio signal, in which audio information of one field is compressed to the period of about 20H, is applied to the first recording amplifier 26 through the input terminal b of the first switching circuit 24, and the output signal from this amplifier 26 is applied to the first head 28 to be recorded on the magnetic tape 3 as an audio track 1b (X–Y) as shown in FIG. 3. At this time, the second head 29 is located in the range (Z–S) in FIG. 2, and the second switching circuit 25 is connectable at its output terminal a to the video signal input terminals 7 and 8. The video signal of second channel applied to the video signal input terminals 7 and 8 is applied through the second switching circuit 25 to the second recording amplifier 27, and the output signal from this amplifier 27 is applied to the second head 29 to be recorded on the magnetic tape 3 as a video track 2a (Z–S) as shown in FIG. 3.

After the first head 28 has recorded the audio signal in the overlapping range (X–Y), the first switching circuit 24 is now free or open. Then, when the second head 29 moves into the overlapping range (X–Y) from the range (S–X) in FIG. 2, the first switching circuit 24 is switched over to be connectable at its input terminal a to the video signal input terminals 7 and 8. The video signal from the input terminals 7 and 8 is applied to the first head 28 through the first recording amplifier 26. At this time, the second switching circuit 25 is switched over to be connectable at its input terminal b to the audio signal input terminal 9, and the audio signal from the input terminal 9 is applied to the second head 29 through the second recording amplifier 27.

In this manner, the first and second switching circuits 24 and 25 are sequentially switched over so that a video signal in the range (Z–S) and an audio signal in the overlapping range (X–Y) can be simultaneously recorded by the two magnetic heads 28 and 29.

Table 1 shows how the signals are recorded by switch-over of the circuits including the first and second switching circuits 24 and 25.

59, and the output signal from this NAND gate 59 is applied to the second switching circuit 25. Thus, when the output signal from the NAND gate 59 is in its "high" level, the video signal applied to the input terminal 50 appears at an output terminal 53, while, when the output signal is in its "low" level, the audio signal applied to the input terminal 51 appears at the output terminal 53. The signals thus appearing at the output terminals 52 and 53 are applied to the first and second heads 28 and 29 respectively so that the signals can be selectively recorded in the sequence shown in Table 1.

Figure 5:
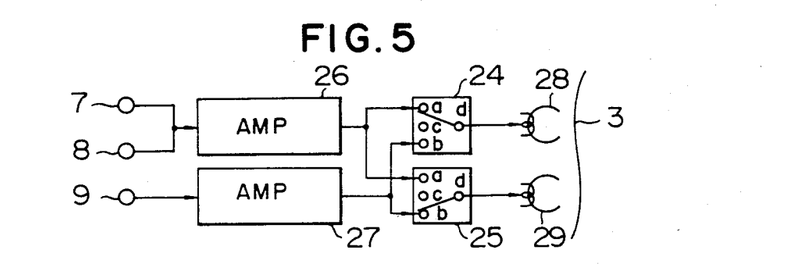
FIG. 5 is a block diagram showing the structure of another embodiment of the recording apparatus according to the present invention.

FIG. 5 shows an another practical embodiment of the recording circuit according to this invention. In the practical embodiment in FIG. 5 the first switching circuit 24 and the second switching circuit 25 are respectively provided at the output sides of the first recording amplifier 26 and the second recording amplifier 27. The circuit operation of FIG. 5 is almost the same as that of

TABLE 1

| Angular position of head 28 | Angular position of head 29 | Signal selected by switch 24 | Signal selected by switch 25 | Signal recorded by head 28 | Signal recorded by head 29 |
|---|---|---|---|---|---|
| S–X | Y–Z | Video of 1st channel | free or open | Video of 1st channel | — |
| X–Y | Z–S | Audio of 1st channel | Video of 2nd channel | Audio of 1st channel | Video of 2nd channel |
| Y–Z | S–X | free or open | Video of 2nd channel | — | Video of 2nd channel |
| Z–S | X–Y | Video of 1st channel | Audio of 2nd channel | Video of 1st channel | Audio of 2nd channel |

Figure 11:
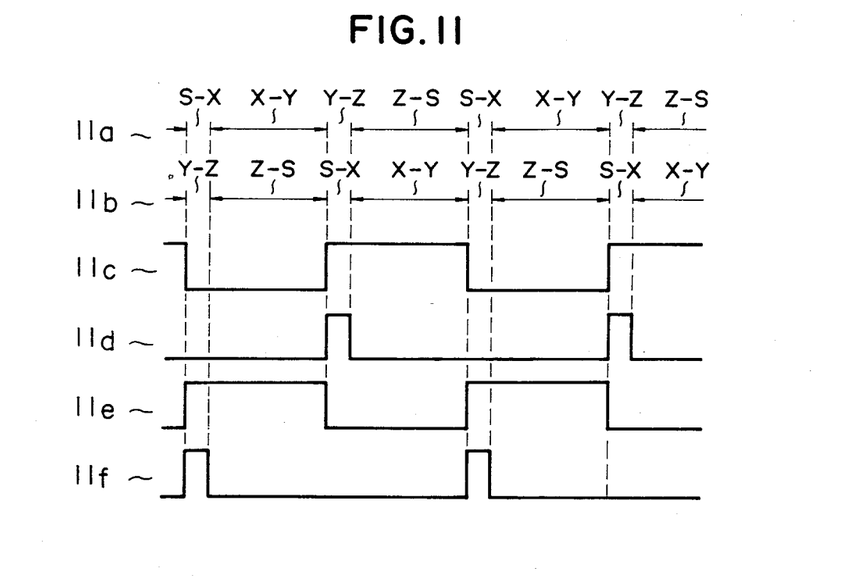
FIG. 11 shows the manner of control for switch-over of the switching circuits in the apparatus of the present invention.
Figure 12:
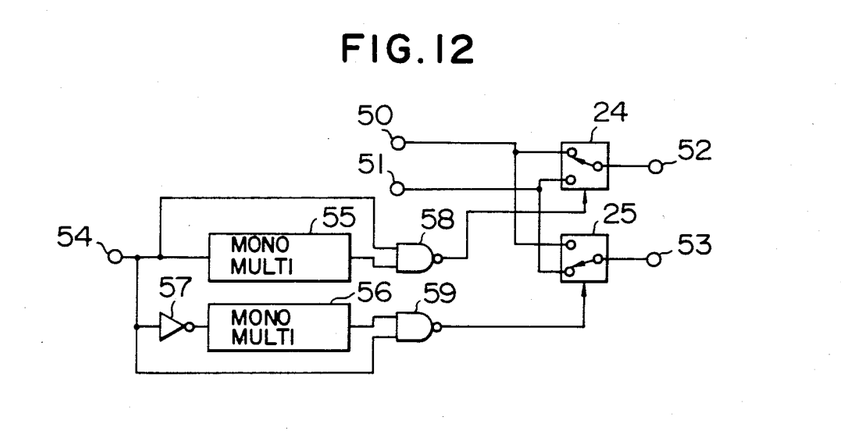
FIG. 12 is a circuit diagram showing the structure of one form of a control circuit generating control signals for controlling the switch-over of the switching circuits.

FIG. 11 shows the manner of control for the switch-over of the switching circuits 24 and 25 shown in FIG. 4, and FIG. 12 shows the structure of one form of a circuit generating control signals for controlling the switch-over of the switching circuits 24 and 25.

In FIG. 11, 11a indicates the timing of the angular position of rotation of the first head 28, and 11b indicates that of the second head 29. In a video tape recorder having a tape-head arrangement as shown in FIG. 2, a cylinder tach pulse generator indicative of the alignment of the first and second heads 28 and 29 on substantially the X–Z axis is generally provided so as to control the rotation of the rotary cylinder 4. This pulse generator generates a pulse signal having a waveform as shown in FIG. 11c of FIG. 11, and such a pulse signal has been used in a conventional video tape recorder as a signal for effecting head switch-over in the playback mode. In the present invention, such a pulse signal is applied to an input terminal 54 in FIG. 12 to be applied directly to a monostable multivibrator 55 and to be applied through an inverter 57 to another monostable multivibrator 56. An output pulse signal having a waveform as shown in 11e of FIG. 11 appears from the inverter 57, and output pulse signals having waveforms as shown in 11d and 11f of FIG. 11 appear from the monostable multivibrators 55 and 56 respectively. The signals shown in 11c and 11d of FIG. 11 are applied to a NAND gate 58, and the output signal from this NAND gate 58 is applied to the first switching circuit 24. Thus, when the output signal from the NAND gate 58 is in its "high" level, a video signal applied to an input terminal 50 appears at an output terminal 52, while, when the output signal is in its "low" level, an audio signal applied to another input terminal 51 appears at the output terminal 52. On the other hand, the signals shown in 11e and 11f of FIG. 11 are applied to another NAND gate FIG. 4. The circuit operation of FIG. 5 is characterized by stopping a recording current by opening a head on which any video signal is not recorded, out of the overlap period thereby the recorded signal can be reduced. Furthermore, the recording-equalizing characteristic of each of the first and second recording amplifiers 26, 27 can be voluntarily selected.

And, the characteristics (such as frequency characteristic or recording current characteristic) of the first and second recording amplifiers 26, 27 can be respectively selected to be fitted for the video signal and the PCM audio signal. In general, the characteristic of the first recording amplifier 26 is selected to be record equalization obtained by a little emphasizing the low frequency part of the recording amplifier 26 for the video signal, and the characteristic of the second recording amplifier 27 is selected to be the recording-equalizing characteristic which is flat for the PCM signal.

Especially, if the characteristic of the second recording amplifier 27 for directly recording the PCM signal is selected to be flat characteristic, the interferences between the codes of the reproduced signal can be more reduced.

Figure 6:
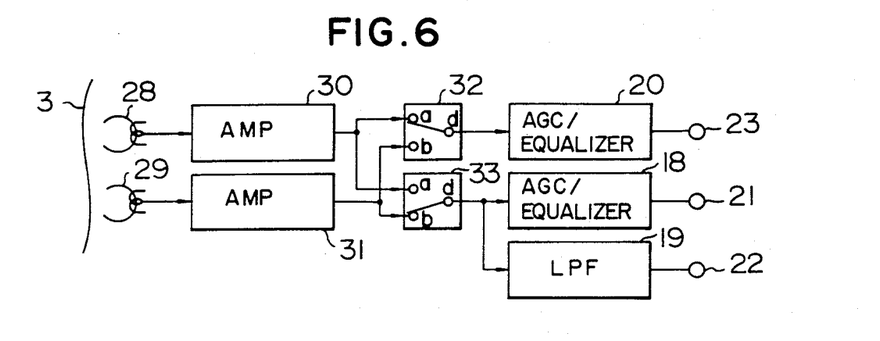
FIG. 6 is a block diagram showing the structure of an embodiment of the reproducing apparatus according to the present invention.

An apparatus for reproducing signals recorded in a manner as described above will now be described. FIG. 6 is a block diagram showing the structure of an embodiment of the reproducing circuit according to the present invention. Referring to FIG. 6, the reproducing circuit includes a first playback amplifier 30 (a preamplifier) and a second playback amplifier 31 (a preamplifier) for amplifying a video signal and an audio signal reproduced from a magnetic tape 3 by the first and second heads 28 and 29 respectively; a third signal selective switching circuit 32 and a fourth signal selective switching circuit 33 for selecting the video signal and audio signal amplified by the playback amplifiers 30 and 31; a first AGC/playback equalizer circuit 18 for separating the FM luminance signal from the video signal selected by the fourth switching circuit 33 and applying it to an FM luminance signal output terminal 21; a low-pass filter 19 for separating the chrominance signal from the video signal and applying it to a chrominance signal output terminal 22; and a second AGC/playback equalizer circuit 20 for applying the audio signal selected by the third switching circuit 32 to an audio signal output terminal 23.

The operation of the reproducing circuit shown in FIG. 6 will now be described with reference to FIGS. 2 and 3.

Suppose, for example, that the first head 28 rotates from the point S toward the point X in FIG. 2 to trace the video track 1a (S–X) of first channel in FIG. 3 thereby reproducing the video signal from that track.

In this case, the reproduced video signal from the first head 28 is applied to the fourth switching circuit 33 after being amplified by the first playback amplifier 30 and is then applied through the input terminal a of this switching circuit 33 to the first AGC/playback equalizer circuit 18 and to the low-pass filter 19. Consequently, the reproduced FM luminance signal appears at the first output terminal 21, and the reproduced low-frequency band converted chrominance signal appears at the second output terminal 22. On the other hand, the third switching circuit 32 is free or open and is ready to pass a signal to the second AGC/playback equalizer circuit 20.

Then, the first head 28 rotates from the point X toward the point Y in FIG. 2 to trace the audio track 1b (X–Y) of first channel thereby starting to reproduce the audio signal recorded in the overlapping range (X–Y). In this case, the third switching circuit 32 is switched over to be connected at its input terminal a to the first playback amplifier 30, so that the reproduced PCM audio signal from the first head 28 is applied to the third switching circuit 32 after being amplified by the first playback amplifier 30 and is then applied through the input terminal a of this switching circuit 32 to the second AGC/playback equalizer circuit 20. At this time, the second head 29 rotates from the point Z toward the point S in FIG. 2 to reproduce the video signal from the video track 2a (Z–S) of second channel in FIG. 3. The reproduced video signal of second channel from the second head 29 is applied to the fourth switching circuit 33 after being amplified by the second playback amplifier 31 and is then applied through the input terminal a of this switching circuit 33 to the first AGC/playback equalizer circuit 18 and to the low-pass filter 19.

After the first head 28 has reproduced the audio signal recorded in the overlapping range (X–Y), the third switching circuit 32 is now free or open. Then, the second head 29 rotates from the point X toward the point Y in FIG. 2 to trace the audio track 2b (X–Y) in FIG. 3 thereby starting to reproduce the audio signal recorded in the overlapping range (X–Y). In this case, the third switching circuit 32 is switched over to be now connected at its input terminal b to the second playback amplifier 31, so that the reproduced PCM audio signal from the second head 29 is applied through the second playback amplifier 31 to the input terminal b of the third switching circuit 32 and thence to the second AGC/playback equalizer circuit 20. At this time, the first head 28 rotates from the point Z toward the point S in FIG. 2 to reproduce the video signal from the video track 1a (Z–S) of second channel in FIG. 3. This reproduced video signal from the first head 28 is applied through the first playback amplifier 30 to the input terminal a of the fourth switching circuit 33 and thence to the first AGC/playback equalizer circuit 18 and to the low-pass filter 19.

In the manner above described, the third and fourth switching circuits 32 and 33 are sequentially switched over so that a video signal in the range (Z–S) and an audio signal in the range (X–Y) can be simultaneously reproduced by the two magnetic heads.

Table 2 shows how the signals are reproduced by switch-over of the circuits including the third and fourth switching circuits 32 and 33. Selection of reproduced signals as shown in Table 2 can be attained by the function of the control circuit shown in FIG. 12. More precisely, referring to FIGS. 11 and 12, a reproduced video signal applied to the input terminal 50 appears at the output terminal 52 when the pulse signals in 11c and 11d of FIG. 11 are in their "low" level, and a reproduced audio signal applied to the input terminal 51 appears at the output terminal 52 when the pulse signals 11c and 11d are in their "high" level. On the other hand, a reproduced video signal applied to the input terminal 50 appears at the output terminal 53 when the pulse signals 11e and 11f are in their "low" level, and a reproduced audio signal applied to the input terminal 51 appears at the output terminal 53 when the pulse signals 11e and 11f are in their "high" level.

TABLE 2

| Angular position of head 28 | Angular position of head 29 | Signal selected by switch 32 | Signal selected by switch 33 | Signal reproduced by head 28 | Signal reproduced by head 29 |
|---|---|---|---|---|---|
| S–X | Y–Z | free or open | video of 1st channel | video of 1st channel | — |
| X–Y | Z–S | audio of 1st channel | video of 2nd channel | audio of 1st channel | video of 2nd channel |
| Y–Z | S–X | free or open | video of 2nd channel | — | video of 2nd channel |
| Z–S | X–Y | audio of 2nd channel | video of 1st channel | audio of 2nd channel | video of 1st channel |

Figure 7:
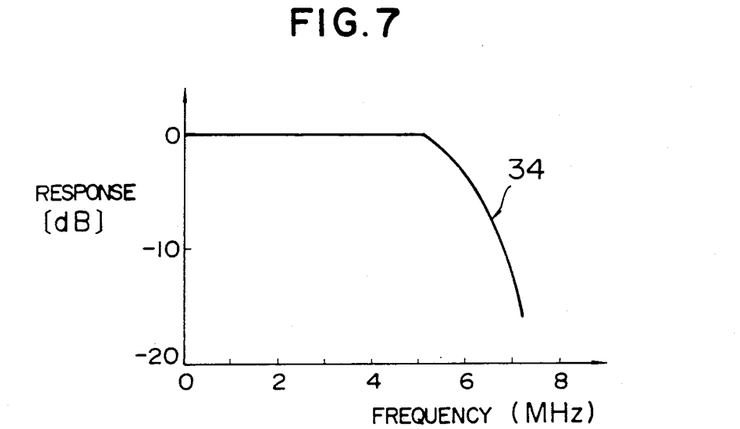
FIGS. 7 and 8 show characteristic curves for illustrating the operation of the reproducing apparatus of the present invention.

FIG. 7 shows an example of frequency characteristics suitable for the first and second playback amplifiers 30 and 31 provided in the reproducing circuit shown in FIG. 6. It will be seen from FIG. 7 that both of these playback amplifiers 30 and 31 have a flat characteristic as shown by the frequency characteristic curve 34.

Figure 8:
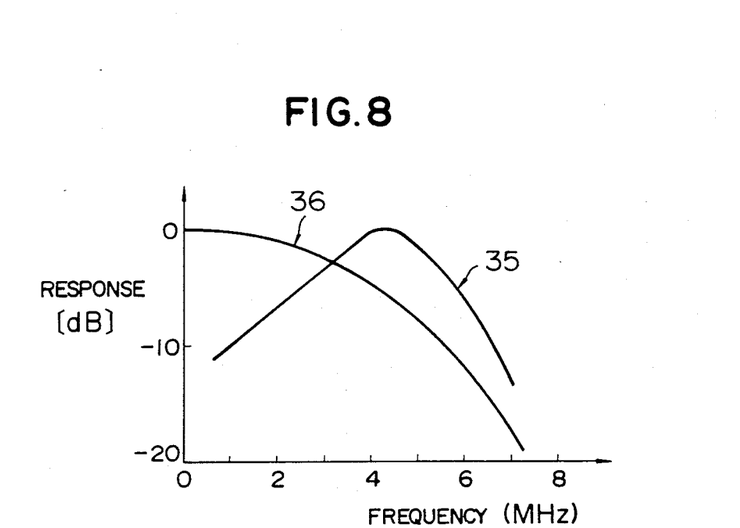

Therefore, these amplifiers 30 and 31 can serve both the function of amplifying a reproduced video signal and the function of amplifying a reproduced audio signal, and it is unnecessary to switch over the characteristics of these amplifiers 30 and 31 depending on whether the input is a video signal or an audio signal. In the reproducing circuit shown in FIG. 6, the reproduced video signal and the reproduced audio signal amplified by the playback amplifiers 30 and 31 are subjected to playback equalization in the first and second AGC/playback equalizer circuits 18 and 20 respectively. FIG. 8 shows an example of playback equalization characteristics of these circuits 18 and 20. In FIG. 8, the curve 35 represents the playback equalization characteristic of the first AGC/playback equalizer circuit 18, and the curve 36 represents that of the second AGC/playback equalizer circuit 20. Especially, the playback equalization characteristic of the equalizer circuit 20 is selected to be analogous to the characteristic of a COS filter or a $COS^2$ filter, and its group delay characteristic is flattened so as to suppress interference between the codes of reproduced signals.

Further, the AGC response characteristics of the first and second AGC/playback equalizer circuits 18 and 20 are selected to be suitable for the respective signals. More precisely, the first AGC/playback equalizer circuit 18 is provided for the FM luminance signal in the video signal, and, because of the capability of drop-out compensation, its AGC response characteristic may be such as to be merely capable of correcting the level difference between the fields. In contrast, the AGC response characteristic of the second AGC/playback equalizer circuit 20 provided for the PCM audio signal is selected to be quicker than that of the first AGC/playback equalizer circuit 18, becuase a level variation leads directly to a code error and the circuit is unable to compensate drop-out.

By selecting the characteristics of the circuits 30, 31, 32 and 33 in the manner above described, a reproduced FM luminance signal and a reproduced low-band converted chrominance signal similar to those provided by a prior art magnetic recording and reproducing apparatus appear at the respective output terminals 21 and 22, and a reproduced PCM audio signal having suppressed code-code interference and an improved S/N ratio appears at the output terminal 23.

Figure 9:
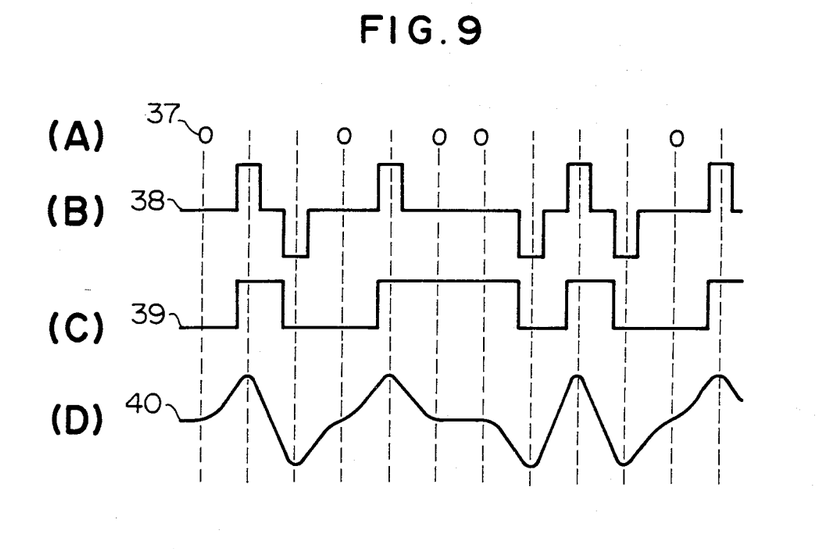
FIG. 9, consisting of (A)–(D), illustrates how a PCM audio signal is recorded and reproduced in the apparatus of the present invention.

The present invention will now be described with reference to employment of the so-called NRZI recording method as an example of PCM recording. First, an audio signal is digitized as shown in FIG. 9A, and this digital signal 37 is then converted into a bipolar code 38 whose highest frequency is, for example, 4.4 MHz, as shown in FIG. 9B. This bipolar code 38 is then integrated to be converted into an NRZI code 39 as shown in FIG. 9C. This NRZI code 39 is then applied to the audio input terminal 9 in FIG. 4 as an audio recording signal, so that a PCM audio signal can be recorded in the overlapping range (X–Y) on a magnetic tape 3 in a manner as described with reference to FIG. 4. In the playback mode, a differentiated signal of the NRZI code 39 appears in the output stages of the first and second heads 28 and 29 due to the differential characteristic of the magnetic circuit system including the magnetic tape and heads. When such an output signal is applied through the first and second playback amplifiers 30 and 31 to the second AGC/playback equalizer circuit 20, a reproduced bipolar code 40 as shown in (D) of FIG. 9 appears at the output terminal 23.

Figure 10:
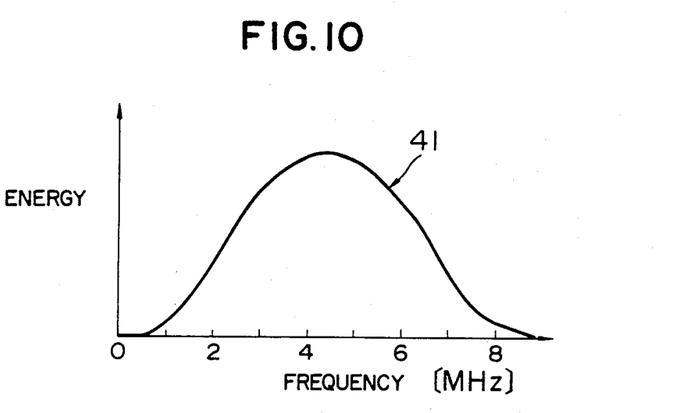
FIG. 10 shows the frequency characteristic of the reproduced bipolar code shown in FIG. 9.

FIG. 10 shows the frequency characteristic of the reproduced bipolar code 40. It will be seen from the curve 41 in FIG. 10 that the reproduced bipolar code 40 does not include any DC components. In a video signal recording and reproducing apparatus, degradation of the S/N ratio and interference between the codes result from the differentiation characteristic of the tape-head system, the great attenuation of low frequency components by the rotary transformer and the delay of the delay time characteristic. Also, the S/N ratio in the frequency range is a matter of concern. However, due to the fact that the reproduced bipolar code 40 does not include any DC components and so many high-frequency components, the low- and high-frequency components can be easily cut off to solve the above problem in practical use.

Thus, according to the PCM recording method above described, the recorded signal can be directly reproduced in the form of the bipolar code, the S/N ratio can be improved, and the interference between the codes can be suppressed to permit recording with the desired high recording density.

As another method permitting PCM recording with high recording density, the so-called partial response IV code may be employed.

These recording methods are well known in the art, and any detailed description of such methods is unnecessary.

It will be understood from the foregoing detailed description that the magnetic recording and/or reproducing apparatus of 2-head helical scan type according to the present invention can record a PCM audio signal on a portion of a magnetic tape overlapping a video signal recording track, so that the increase in the cost due to PCM recording can be minimized. Also, the present invention can provide a circuit structure suitable for recording of such a PCM signal with high recording density without giving rise to degradation of the quality of a picture signal.

I claim:

1. A magnetic recording apparatus of 2-head helical scan type comprising:
   (a) means including a first and a second magnetic head for forming tracks carrying records of fields of first and second channels respectively of a video signal in a helical direction of a magnetic tape by recording the video signal by said first and second heads, and further recording first and second channels of a digital audio signal corresponding to the first and second channels of said video signal on one end portion of said tracks carrying the records of first and second channels respectively;
   (b) a first and a second recording amplifier amplifying said video signal and said audio signal;
   (c) signal selecting means for selectively applying said video signal and said audio signal to said first and second heads; and
   (d) control means for controlling the recording operation so that said audio signal is recorded by said first head on the end portion of said track of first channel in simultaneous relation with recording of said video signal by said second head on said track of second channel, and said audio signal is recorded by said second head on the end portion of said track of second channel in simultaneous relation with recording of said video signal by said first head on said track of first channel; whereby said video signal and said audio signal are simultaneously recorded by said two heads.

2. A magnetic recording apparatus as claimed in claim 1, wherein said signal selecting means is disposed on the outside side of said first and second recording amplifiers, said first recording amplifier being selected to have a recording equalization characteristic for emphasizing low-frequency components, said second recording amplifier being selected to have a flat recording equalization characteristic.

3. A magnetic reproducing apparatus of 2-head helical scan type comprising:
(a) means including a first and a second magnetic head making contact with tracks of first and second channels respectively formed by recording in a helical direction of a magnetic tape, for reproducing first and second channels of a video signal from said tracks of first and second channels and reproducing first and second channels of a digital audio signal recorded on one end portion of said tracks;
(b) a first playback amplifier amplifying said video signal and said audio signal reproduced by said first head in said reproducing means;
(c) a second playback amplifier amplifying said video signal and said audio signal reproduced by said second head in said reproducing means;
(d) signal selecting means for selectively switching the video and audio signal from said first and second playback amplifiers;
(e) a first playback equalizer circuit provided for the playback equalization of the video signal selected by said signal selecting means;
(f) a second playback equalizer circuit provided for the playback equalization of the audio signal selected by said signal selecting means; and
(g) control means for controlling the reproducing operation so that said audio signal is reproduced by said first head from the end portion of said track of first channel in simultaneous relation with reproduction of said video signal by said second head from said track of second channel, and said audio signal is reproduced by said second head from the end portion of said track of second channel in simultaneous relation with reproduction of said video signal by said first head from said track of first channel, whereby said video signal and said audio signal are simultaneously reproduced by said two heads.

4. A magnetic reproducing apparatus as claimed in claim 3, wherein said audio signal playback equalizer circuit has a characteristic analogous to that of a COS filter and its group delay characteristic is flat.

5. A magnetic reproducing apparatus as claimed in claim 3, wherein said first and second playback amplifiers are preamplifiers having a flat characteristic.

6. A magnetic recording apparatus of 2-head helical scan type comprising a first and a second magnetic head disposed to maintain an angular spacing of 180° therebetween and adapted to rotate in unitary relation to form tracks of records extending in a helical direction of a magnetic tape, wherein said first and second heads make contact with said magnetic tape over an angular rotation range of $(180°+\theta)$ $(\theta << 180°)$ during their one complete revolution of 360°, and means are provided for recording a video signal to form said tracks by said first and second heads while said heads are in contact with said magnetic tape over an angular rotation range of 180° and further recording an audio signal on one end portion of said tracks by said first and second heads while said heads are in contact with said magnetic tape over an angular rotation range of $\theta°$, whereby said audio signal is recorded by said first or second head in simultaneous relation with recording of said video signal by said second or first head.

7. A magnetic recording apparatus of 2-head helical scan type comprising a first and secong magnetic head disposed to maintain an angular spacing of 180° therebetween and adapted to rotate in unitary relation to form tracks of records of first and second channels extending in a helical direction of a magnetic tape by making contact with said magnetic tape over an angular rotation range of $(180°+\theta)$ $(\theta << 180°)$ during their one complete revolution of 360°, said apparatus comprising a first and a second recording amplifier amplifying a video signal and a PCM audio signal and applying the amplified signals to said first and second heads, and video/audio signal selective switching means disposed on the input side or output side of said first and second recording amplifiers, said switching means including a first switching circuit selectively applying said video signal to said first head while said first head makes contact with the track of first channel on said magnetic tape over an angular rotation range of 180°, and selectively applying said audio signal to said first head while said first head makes contact with one end protion of the track of first channel on said magnetic tape over an angular rotation range of $\theta°$, and a second switching circuit selectively applying said video signal to said second head while said second head makes contact with the track of second channel on said magnetic tape over an angular rotation range of 180° and selectively applying said audio signal to said second head while said second head makes contact with one end portion of the track of second channel on said magnetic tape over an angular rotation range of $\theta°$, whereby said audio signal of first and second channels is applied to said first and second heads in simultaneous relation with application of said video signal of second and first channels to said second and first heads.

* * * * *